(12) United States Patent
Kato

(10) Patent No.: US 7,311,255 B2
(45) Date of Patent: Dec. 25, 2007

(54) MAGNETIC DETECTION DEVICE

(75) Inventor: Takuji Kato, Chiba-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 800 days.

(21) Appl. No.: 10/752,544

(22) Filed: Jan. 8, 2004

(65) Prior Publication Data

US 2004/0151524 A1 Aug. 5, 2004

(30) Foreign Application Priority Data

Jan. 29, 2003 (JP) .............................. 2003-020447

(51) Int. Cl.
*G06K 7/08* (2006.01)
(52) U.S. Cl. ..................... 235/449; 235/479
(58) Field of Classification Search ................ 235/449, 235/475, 477, 479; 360/90, 85, 83, 130.31, 360/95, 251.3, 71
See application file for complete search history.

(56) References Cited

U.S. PATENT DOCUMENTS

| | | | | |
|---|---|---|---|---|
| 4,295,169 A | * | 10/1981 | Iwata et al. ..................... 360/71 |
| 4,571,459 A | * | 2/1986 | Yata ............................. 379/83 |
| 4,750,062 A | * | 6/1988 | Suzuki ......................... 360/85 |
| 5,218,492 A | * | 6/1993 | Miyamoto et al. ............. 360/85 |
| 5,646,392 A | * | 7/1997 | Oguchi ....................... 235/475 |
| 6,129,466 A | * | 10/2000 | Suzuki .................... 400/615.2 |
| 6,182,896 B1 | * | 2/2001 | Momose ..................... 235/449 |
| 6,186,683 B1 | * | 2/2001 | Shibuki ................. 400/120.08 |
| 6,225,570 B1 | * | 5/2001 | Ishiyama et al. ........... 174/260 |
| 2004/0011915 A1 | * | 1/2004 | Korthauer ................. 242/563.1 |
| 2006/0216100 A1 | * | 9/2006 | Minoya et al. ............. 400/619 |
| 2006/0268292 A1 | * | 11/2006 | Takeuchi .................... 358/1.8 |

FOREIGN PATENT DOCUMENTS

JP 9-180004 7/1997

* cited by examiner

*Primary Examiner*—Thien Minh Le
(74) *Attorney, Agent, or Firm*—Pillsbury Winthrop Shaw Pittman, LLP

(57) ABSTRACT

A magnetic detection device has a roller unit to which conveying rollers are attached, a fixing unit that installs the roller unit movably in the direction to contact to or leave away from a magnetic head, and eccentric shafts that are provided rotatably between the fixing unit and the roller unit. This magnetic detection device has an adjusting means to adjust a gap between the magnetic head and the conveying roller by relatively moving the roller unit to against the fixing unit.

3 Claims, 4 Drawing Sheets

MAGNETIC DETECTION DEVICE

CROSS-REFERENCE

This application is based upon and claims the benefit of priority from the prior Japanese Patent Application No. 2003-020447, filed on Jan. 29, 2003, the entire contents of which are incorporated herein by reference.

BACKGROUND OF THE INVENTION

1. Field of the Invention

This invention relates to a magnetic detection device for detecting magnetic ink printed on media, the device being applicable to, for instance, a valuable media processing machine to inspect the media as securities.

2. Description of the Related Art

This kind of magnetic detection device is equipped with a magnetic sensor and a conveying roller mechanism that are arranged opposing to each other with a gap between. Media are passed through the magnetic sensor and the conveying roller mechanism and printed magnetic inks are detected.

To detect magnetic ink, media are needed to pass through the magnetic detection device in contact with the surface of the magnetic sensor and conveyed while kept pushed against the surface of the magnetic sensor by conveying rollers.

Further, the magnetic sensor is statically installed and the conveying rollers are installed rotatably. The magnetic sensor and the conveying rollers are arranged with a certain gap between them so that they do not contact each other.

A gap between the surface of the magnetic sensor and the surfaces of the conveying rollers is adjusted by moving the conveying roller mechanism close to or far away from the surface of the magnetic sensor.

However, it was so far difficult to adjust a gap precisely and furthermore, a long time was needed because a gap was adjusted by loosening the fixing screw fixing the conveying roller mechanism at a specified position and then, moving the conveying roller mechanism directly.

Further, in the case of a conveying roller mechanism with many conveying rollers installed to a rotary shaft axially for pressing a wide area simultaneously, it was difficult to adjust gaps uniformly at axial points of the rotary shaft.

SUMMARY OF THE INVENTION

It is an object of this invention to provide a magnetic detection device that is capable of adjusting a gap between a magnetic head and conveying rollers easily and precisely.

According to this invention, a magnetic detection device is provided. This device comprises a magnetic head that detects magnetic information recorded on media that are conveyed; conveying rollers arranged with a prescribed gap against the magnetic head; a roller unit to which the conveying rollers are attached; a fixing unit that installs the roller unit movably in the direction to contact to or leave away from the magnetic head; and eccentric shafts that are provided rotatably between the fixing unit and the roller unit, wherein the roller unit is moved relatively to the fixing unit by rotating the eccentric shafts and the gap between the magnetic head and the conveying rollers is thus adjusted.

DETAILED DESCRIPTION OF THE INVENTION

This invention will be described below in detail referring to an embodiment shown in the attached drawings.

Figure 1:
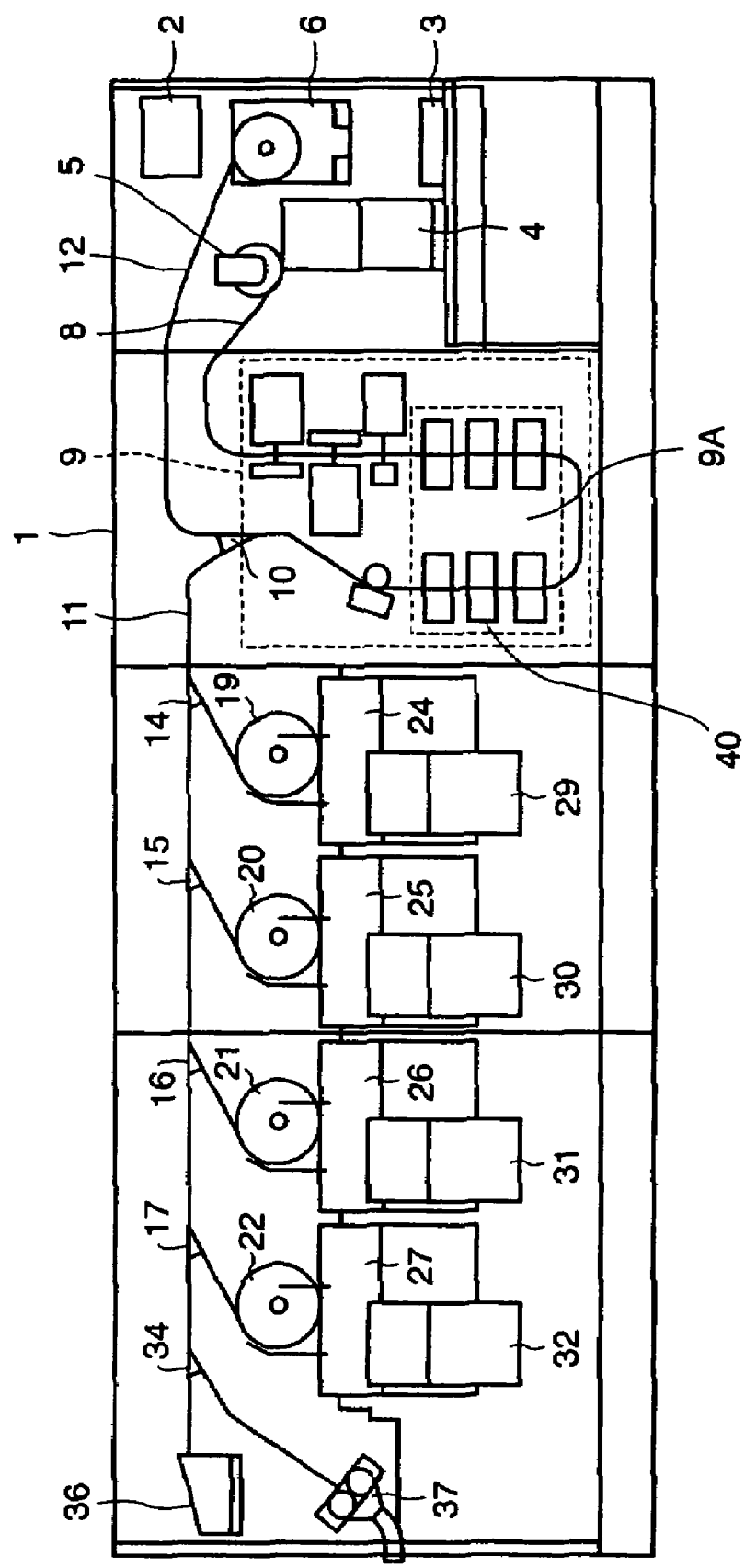
FIG. 1 is a general construction diagram showing the a valuable security inspection device that is an embodiment of this invention.

FIG. 1 shows a valuable media processing machine for inspecting, classifying and processing such media as valuable securities (hereinafter referred to as securities) according to the result of inspection.

On one side of the main body of the valuable media processing machine, there are a display panel 2 and an operating panel 3 provided. There is provided a supply portion 4 into which securities are put near operating panel 3. Securities put into supply portion 4 are taken out one by one by a take-out roller. There is a reject pocket 6 provided below display panel 2 for stacking securities that are to be discharged.

Securities taken out by take-out roller 5 are conveyed to an inspection unit 9 through a first conveying path 8. Various kinds of sensor units 9 that are selectively used are provided in inspection unit 9. At the terminal portion of first conveying path 8, a second conveying path 11 and a reject sheet conveying path 12 are connected through a first gate 10.

To second conveying path 11, a first to fourth stackers 19 to 22 are connected through second to fifth gates 14 to 17. First to fourth stackers 19 to 22 are provided with banding units 24 to 27, respectively. Further, containers 29 to 32 for containing banded securities are provided in front of banding units 24 to 27.

On the other hand, to the terminal portion of second conveying path 11, an inspection stacker 36 and a shredder 37 are connected through a sixth gate 34.

Next, the processing operation of the valuable media processing machine will be explained.

Securities put into supply portion 4 are taken out one by one by the rotation of take-out roller 5. The taken out securities are conveyed to sensor unit 9 and when passing through sensor unit 9, magnetic information of the securities is inspected. The inspected securities are sorted for sending to second conveying path 11 or reject sheet conveying path 12 by the movement of first gate 10 based on the inspection result. Securities sorted for reject sheet conveying path 12 are stacked in reject packet 6. Securities sorted for second conveying path 11 are sent to first to fourth stackers 19 to 22 or inspection stacker 36 or shedder 37 by the movement of second to sixth gates 14 to 17 and 34. When securities sent to first to fourth stackers are accumulated to specify number sheets, for instance, 100 sheets, they are banded by banding units 24 to 27 and contained in containers 29 to 32.

There is a magnetic detection unit 40 that is one of magnetic detection devices of various kinds of sensor units 9A. This magnetic detection unit 40 is to detect magnetic ink printed on securities. What are printed in magnetic ink on securities are, for instance, serial numbers.

Figure 2:
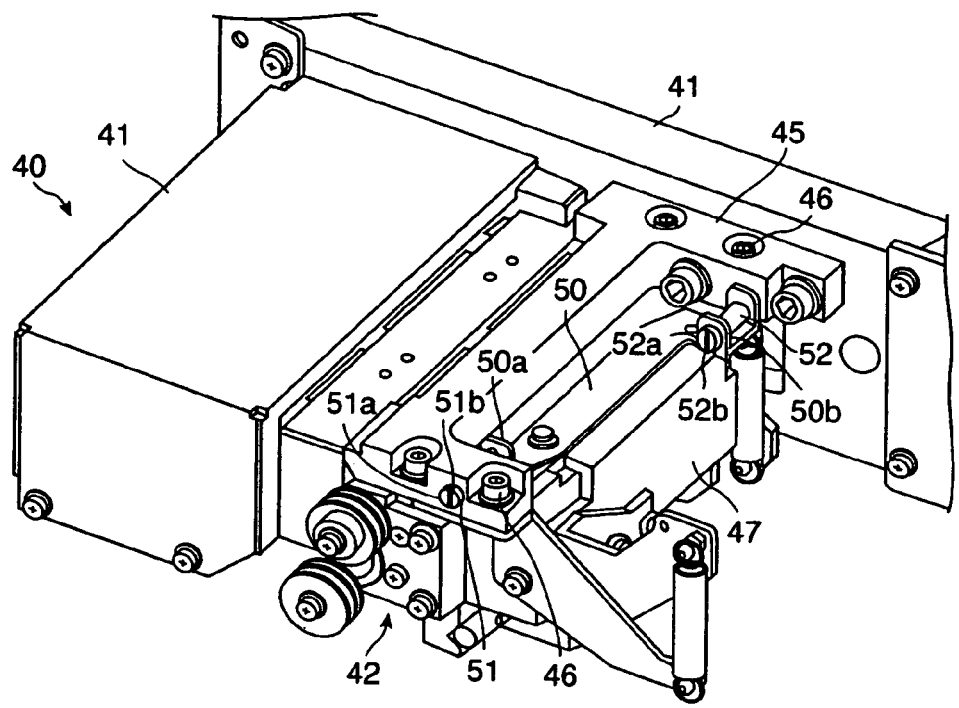
FIG. 2 is a perspective view showing a magnetic detection unit provided to the valuable security inspection device shown in FIG. 1.
Figure 3:
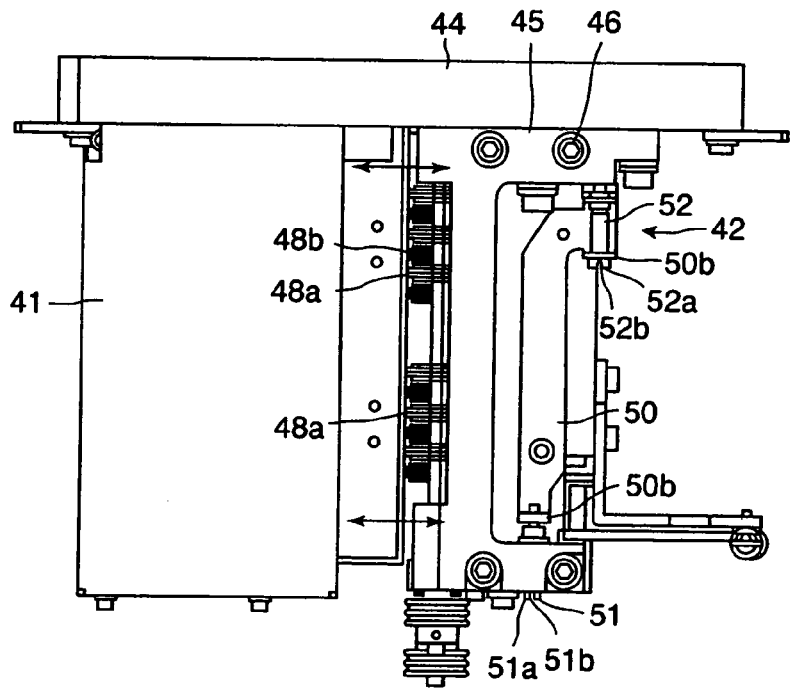
FIG. 3 is a plan view showing the magnetic detection unit shown in FIG. 3.
Figure 4:
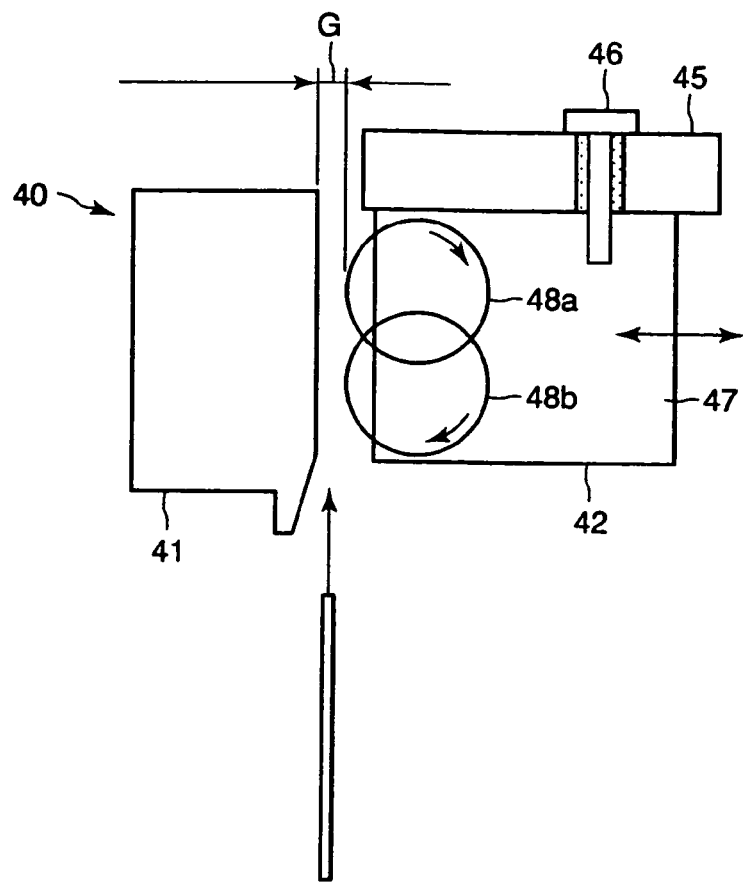
FIG. 4 is a schematic front view showing the magnetic detection unit shown in FIG. 2.

FIG. 2 is a perspective view showing magnetic detection unit 40, FIG. 3 is its plan view, and FIG. 4 is its front view.

Magnetic detection unit 40 is composed of a magnetic head 41 as a detection means and a conveying roller mechanism 42, which are placed opposing to each other through a medium conveying path (with a gap). The rear sides of magnetic head 41 and conveying roller mechanism 42 are fixed to a support frame 44.

Conveying roller mechanism 42 is composed of a fixing unit 45 and a roller unit 47 that is movably provided on the lower surface side of fixing unit 45. Roller unit 47 is movable in the direction to contact to or leave away from magnetic head 41 and fixed to fixing unit 45 with a fixing member 46.

Upper and lower conveying rollers 48a and 48b are installed to roller unit 47. Upper and lower conveying units 48a and 48b are arranged opposing to magnetic head 41. Plural upper and lower conveying rollers 48a and 48b are installed to a rotating shaft in its axial direction and arranged in the state partially nested each other.

On the upper surface of roller unit 47, a bracket 50 is statically provided. A first upright portion 50a is formed at one end side of bracket 50 and a second upright portion 50b is formed at the other end side integrally.

Figure 5:
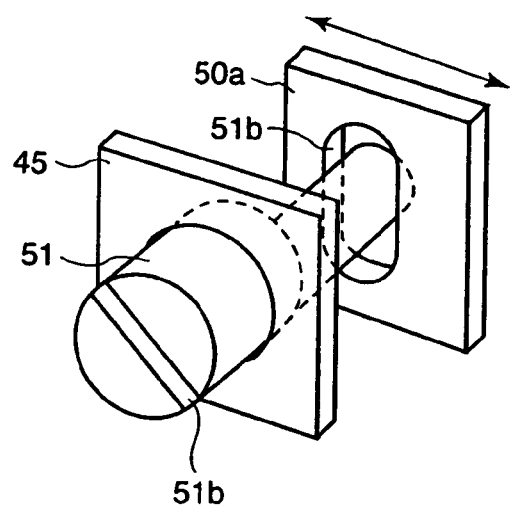
FIG. 5 is a perspective view showing an eccentric shaft provided to the magnetic detection unit shown in FIG. 2.

At the front side of fixing unit 45, a first eccentric shaft 51 is installed as an adjusting means. The front end of first eccentric shaft 51 is inserted into a long hole 50c formed in the vertical direction on first upright portion 50a of bracket 50 as illustrated in a diagram shown in FIG. 5.

A second eccentric shaft 52 is installed as an adjusting means to second upright portion 50b of bracket 50. The front end of second eccentric shaft 52 is inserted into a long hole (not illustrated) formed in the vertical direction on fixing unit 45.

On heads 51a and 52a of first and second eccentric shafts 51 and 52, groove portions 51b and 52b into which a minus screwdriver is fitted are formed.

First and second eccentric shafts 51 and 52 are arranged out of alignment from the same line so that they are not collinear positioned.

A medium G (shown in FIG. 4) is sent between magnetic head 41 and conveying rollers 48a and 48b of thus composed magnetic detection unit 40 and magnetic ink is detected by magnetic head 41. At this time, the medium K is pressed against magnetic head 41 by conveying rollers 48a and 48b. In order for medium K to satisfactorily contact conveying rollers 48a and 48b, a gap between magnetic head 41 and conveying rollers 48a and 48b must be maintained properly.

Next, how to adjust gap G between magnetic head 41 and conveying rollers 48a and 48b will be explained.

First, adjust a front side gap. In this case, rotate first eccentric shaft 51 by inserting the tip of a minus screwdriver into groove portion 51b of a head portion 51a of first eccentric shaft 51. The front end of first eccentric shaft 51 is rotated in long hole 50c of first upright portion 50a of bracket 50. As a result of this rotation, upright portion 50a is moved in the arrow direction and moves roller unit 47 in the arrow direction. The front side gap between magnetic sensor 41 and conveying rollers 48a and 48b is adjusted as a result of this movement.

Then, adjust a rear side gap. In this case, rotate second eccentric shaft 52 by inserting the tip of a minus screwdriver into groove portion 52b of a head portion 52a of second eccentric shaft 52. As a result of this rotation, the end of second eccentric shaft 52 is rotated in the long hole (not illustrated) of fixing unit 45 and roller unit 47 is moved in the arrow direction. As a result of the rotation of roller unit 47, a rear gap between magnetic sensor 41 and conveying rollers 48a and 48b is adjusted.

As described above, according to this embodiment, the gap between magnetic sensor 41 and conveying rollers 48a and 48b is adjusted as a result of the rotation of eccentric shafts 51 and 52. Thus, it becomes possible to adjust a gap more precisely than the gap adjustment so far made by manually moving the conveying roller mechanism.

That is, by rotating eccentric shafts 51 and 52, it is possible to make a gap small or large by the same operation. Furthermore, the adjustment can be made easily using such a general tool as a screwdriver.

Further, as first and second eccentric shafts 51 and 52 are provided, it becomes easy to adjust balance of gaps at several points. This is because the position of roller unit 57 is kept unchanged unless eccentric shafts 51 and 52 themselves rotate and it is possible to adjust a gap at one point independently by keeping a gap at another point. Thus, in such a case wherein a wide detection area of magnetic detection as in this embodiment is demanded, it is possible to realize it by easily adjusting a prescribed gap over the entire area.

Further, because first and second eccentric shafts 51 and 52 are arranged out of alignment each other by displacing from the same line, when second eccentric shaft is rotated with a screwdriver, it is possible to rotate second eccentric shaft smoothly unobstructed by first eccentric shaft 51.

Figure 6:
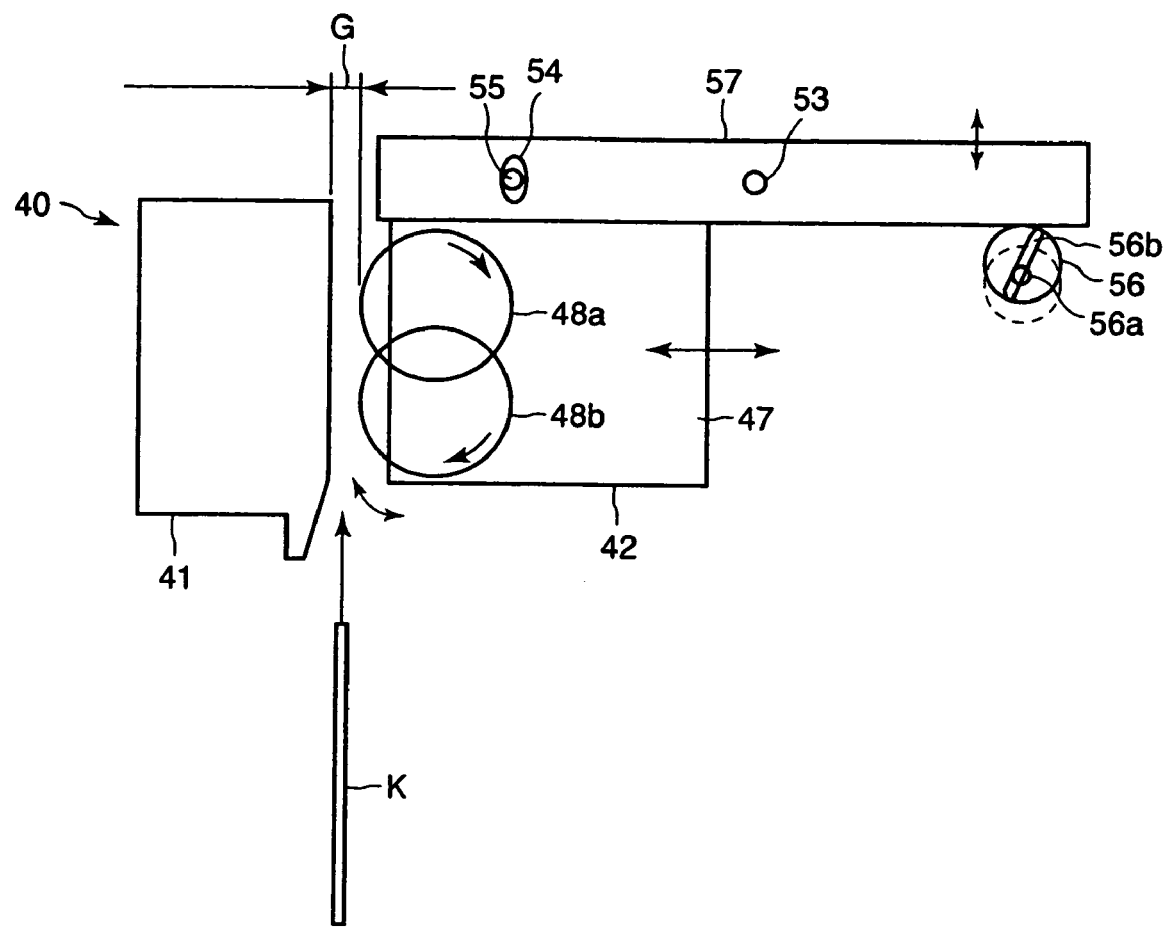
FIG. 6 is a schematic front view showing other aspects of the magnetic detection unit.

FIG. 6 shows a magnetic detection unit that is capable of adjusting gap G between magnetic head 41 and conveying rollers 48a and 48b as another aspect of this invention.

An arm member 57 is installed to support frame 44 in the oscillatory state. That is, arm member 57 is attached to support frame 44 via a rotating shaft 53 so that its almost central portion in the longitudinal direction becomes the center of rotation. There is a long hole 54 formed at the left to arm member 57 shown in FIG. 6 and arm member 57 is fixed to support frame 44 by fastening a screw 55 inserted into this long hole 54. When screw 55 is loosened, arm member 57 can be oscillated in the arrow direction along long hold 54.

At the right side of arm member 57 shown in FIG. 6, there is an eccentric cam 56 attached to support frame 44 through a rotating shaft 56a. Eccentric cam 56 has a groove portion 56b formed on its surface so that a minus screwdriver can be inserted into it. When screwdriver is inserted into groove portion 56b and rotated, eccentric cam 56 rotates eccentrically between the solid line position and the dotted line position shown in the figure. As a result of this eccentric rotation of eccentric cam 56, arm member 57 oscillates in the arrow direction.

Roller unit 47 is installed to arm member 57.

Next, how to adjust a gap G between magnetic head 41 and rollers 48a and 48b will be explained.

First, loosen screw 55 so as to enable arm ember 57 to oscillate. Then, insert a minus screwdriver into groove portion 56b of eccentric cam 56 and rotate the screwdriver. As a result of the rotation of the screwdriver, eccentric cam 56 rotates eccentrically between the solid line position and the dotted line position shown in FIG. 6. This eccentric rotation oscillates arm member 57 in contact with this eccentric cam in the arrow direction. When eccentric cam 56 oscillates in the clockwise direction shown in FIG. 6, conveying roller 48a arranged in roller unit 47 moves in the direction to make a gap G wide and at the same time, roller 48b moves in the direction to make a gap G narrow. Thus, a gap G to magnet head 41 is adjusted.

On the contrary, when eccentric cam 56 oscillates in the counterclockwise direction, conveying roller 48a arranged in roller unit 47 moves in the direction to make a gap G narrow and at the same time, conveying roller 48b moves in the direction to make a gap G wide. Thus, the gap G to magnetic head 41 is adjusted.

Arm member 57 is fixed to support frame 44 and roller unit 47 is also fixed by fastening screw 55 at a position where gap G is optimized.

Further, this invention is not restricted to the embodiment described above but can be applied by modifying variously within the scope of its purport.

According to this invention, a gap between the conveying rollers and the magnetic head is adjusted by moving the roller unit by rotating the eccentric shaft or the eccentric cam as explained above. It becomes therefore possible to make the gap adjustment more precisely than the adjustment so far made by manually moving forward or backward the conveying roller mechanism.

Further, the first and second eccentric shafts are provided between one ends and the other end of the roller unit and the fixing unit and a gap is adjusted by rotating these first and second eccentric shafts. Therefore, even when a wide magnetic detection area is demanded, it is possible to easily obtain a specified gap between the conveying rollers and the magnetic head for the entire area.

What is claimed is:

1. A magnetic detection device comprising:
   a magnetic head that detects magnetic information recorded on media that are conveyed;
   conveying rollers arranged with a prescribed gap against the magnetic head;
   a roller unit to which the conveying rollers are attached;
   a fixing unit that installs the roller unit movably in the direction to contact to or leave away from the magnetic head; and
   eccentric shafts that are provided rotatably between the fixing unit and the roller unit,
   wherein the roller unit is moved relatively to the fixing unit by rotating the eccentric shafts and the gap between the magnetic head and the conveying rollers is thus adjusted,
   wherein the eccentric shafts are provided with a first and a second eccentric shafts, and the roller unit is moved relatively to the fixing unit to adjust the gap between the magnetic head and the conveying rollers by rotating the first and the second eccentric shafts, and
   wherein the first and the second eccentric shafts are arranged to displace each other from a reference line.

2. A magnetic detection device comprising:
   a magnetic head that detects magnetic information recorded on media that are conveyed;
   conveying rollers arranged with a prescribed gap against the magnetic head;
   a roller unit to which the conveying rollers are attached;
   a fixing unit that installs the roller unit movably in the direction to contact to or leave away from the magnetic head; and
   eccentric shafts that are provided rotatably between the fixing unit and the roller unit,
   wherein the roller unit is moved relatively to the fixing unit by rotating the eccentric shafts and the gap between the magnetic head and the conveying rollers is thus adjusted,
   wherein the eccentric shafts are provided with a first and a second eccentric shafts, and the roller unit is moved relatively to the fixing unit to adjust the gap between the magnetic head and the conveying rollers by rotating the first and the second eccentric shafts, and
   wherein the roller unit is provided with a bracket that has a first upright portion at its one end and a second upright portion at the other end, the first eccentric shaft is provided between the first upright portion and one end of the fixing unit, and the second eccentric shaft is provided between the second upright portion and the other end of the fixing unit.

3. The magnetic detection device according to claim 1 further comprising:
   a support frame to support the fixing unit statically and the roller unit rotatably.

* * * * *